United States Patent
Takahashi (10) Patent No.: US 10,061,245 B2
(45) Date of Patent: Aug. 28, 2018

(54) IMAGE FORMING APPARATUS THAT RESTRICTS REMOVAL OF CONTAINER WITH REMAINING TONER BY THIRD PERSON

(71) Applicant: KYOCERA Document Solutions Inc., Osaka (JP)

(72) Inventor: Tomohiro Takahashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/789,444

(22) Filed: Oct. 20, 2017

(65) Prior Publication Data

US 2018/0164725 A1    Jun. 14, 2018

(30) Foreign Application Priority Data

Dec. 12, 2016 (JP) ................................ 2016-240110

(51) Int. Cl.
  *G03G 15/08* (2006.01)
  *G03G 15/22* (2006.01)
  (Continued)

(52) U.S. Cl.
  CPC ......... *G03G 15/22* (2013.01); *G03G 15/0863* (2013.01); *G03G 21/1661* (2013.01);
  (Continued)

(58) Field of Classification Search
  CPC ............... G03G 15/22; G03G 15/0863; G03G 21/1661; G03G 21/1676;
  (Continued)

(56) References Cited

U.S. PATENT DOCUMENTS 5,579,088 A * 11/1996 Ko .................. G03G 21/04
  399/12
6,091,912 A * 7/2000 Kitajima et al. ....... G03G 15/08
  399/13

(Continued)

FOREIGN PATENT DOCUMENTS

JP    2011-028017 A    2/2011

*Primary Examiner* — Ryan Walsh
(74) *Attorney, Agent, or Firm* — Stein IP, LLC (57) ABSTRACT

An image forming apparatus includes a mounting unit, a restricting member, a driving source, a reading unit, a storage unit, and a control unit. The reading unit reads mounting-destination information from a storage medium. The mounting-destination information is information stored in the storage medium located in the container and information assigned to the image forming apparatus used by an ordering source user who has ordered the container. The own-apparatus information is information assigned to its own apparatus. The control unit that determines whether the mounting-destination information read from the storage medium of the container mounted to the mounting unit by the reading unit matches the own-apparatus information or not when the container is mounted to the mounting unit, and the control unit controlling driving of the driving source to move the restricting member to a restriction position when the mounting-destination information matches the own-apparatus information.

5 Claims, 5 Drawing Sheets

(51) Int. Cl.
*H04N 1/00* (2006.01)
*G03G 21/16* (2006.01)

(52) U.S. Cl.
CPC ..... *G03G 21/1676* (2013.01); *H04N 1/00538* (2013.01); *G03G 2215/0695* (2013.01); *G03G 2215/0697* (2013.01); *G03G 2221/1654* (2013.01); *G03G 2221/1823* (2013.01); *H04N 2201/0081* (2013.01); *H04N 2201/0082* (2013.01)

(58) Field of Classification Search
CPC ... G03G 2215/0695; G03G 2215/0697; G03G 2221/1654; G03G 2221/1823; H04N 1/00538; H04N 2201/0081; H04N 2201/0082
See application file for complete search history.

(56) References Cited

U.S. PATENT DOCUMENTS

| | | | | |
|---|---|---|---|---|
| 6,595,191 B2 * | 7/2003 | Braun et al. | G03G 15/08 | 399/12 |
| 6,711,362 B2 * | 3/2004 | Asakura | B41J 2/175 | 399/12 |
| 6,768,877 B2 * | 7/2004 | Alegria et al. | G03G 15/00 | 399/9 |
| 8,509,651 B2 * | 8/2013 | Tsukijima | G03G 15/08 | 399/114 |
| 2006/0278699 A1 * | 12/2006 | Guan et al. | G06K 5/00 | 235/382 |
| 2007/0071458 A1 * | 3/2007 | Tanaka et al. | G03G 15/00 | 399/12 |
| 2009/0087198 A1 * | 4/2009 | Okamura | G03G 15/00 | 399/12 |
| 2010/0196019 A1 * | 8/2010 | Kojo | G03G 15/00 | 399/8 |
| 2010/0272452 A1 * | 10/2010 | Tsukijima | G03G 15/08 | 399/27 |
| 2016/0054680 A1 * | 2/2016 | Okuda | G03G 15/08 | 399/258 |
| 2017/0102637 A1 * | 4/2017 | Seto | G03G 15/08 | |
| 2017/0315470 A1 * | 11/2017 | Mochizuki et al. | G03G 15/08 | |
| 2017/0315501 A1 * | 11/2017 | Mochizuki et al. | G03G 21/16 | |
| 2018/0074437 A1 * | 3/2018 | Mizutani | G03G 15/08 | |

* cited by examiner

IMAGE FORMING APPARATUS THAT RESTRICTS REMOVAL OF CONTAINER WITH REMAINING TONER BY THIRD PERSON

INCORPORATION BY REFERENCE

This application is based upon, and claims the benefit of priority from, corresponding Japanese Patent Application No. 2016-240110 filed in the Japan Patent Office on Dec. 12, 2016, the entire contents of which are incorporated herein by reference.

BACKGROUND

Unless otherwise indicated herein, the description in this section is not prior art to the claims in this application and is not admitted to be prior art by inclusion in this section.

There is known a typical image forming apparatus that forms a toner image based on image data of an image to be printed to transfer the toner image on a paper sheet. In such an image forming apparatus, containers housing toners are mounted. Then, the toners housed in the containers are used during execution of print jobs.

The toners inside the containers are consumed by execution of the print jobs, and a toner inside the container finally runs out. In view of this, the container is replaceable. Then, when the toner in the container runs out, the empty container is replaced with a new container filled with the toner.

For example, ordering of a container is performed by a user, and the container is delivered to an ordering source user. Then when the toner inside the container mounted to the image forming apparatus used by the ordering source user runs out, the ordering source user mounts the container, which has been delivered to the ordering source user himself or herself, to the image forming apparatus used by the ordering source user himself or herself.

SUMMARY

An image forming apparatus according to one aspect of the disclosure includes a mounting unit, a restricting member, a driving source, a reading unit, a storage unit, and a control unit. A container housing toner is mounted in the mounting unit. The restricting member restricts removal of the container from the mounting unit by moving to a predetermined restriction position. The driving source is for moving the restricting member. The reading unit reads mounting-destination information from a storage medium. The mounting-destination information is information stored in the storage medium located in the container and information assigned to the image forming apparatus used by an ordering source user who has ordered the container. The storage unit preliminarily stores own-apparatus information. The own-apparatus information is information assigned to its own apparatus. The control unit that determines whether the mounting-destination information read from the storage medium of the container mounted to the mounting unit by the reading unit matches the own-apparatus information or not when the container is mounted to the mounting unit, and the control unit controlling driving of the driving source to move the restricting member to the restriction position when the mounting-destination information matches the own-apparatus information.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Overall Configuration of Image Forming Apparatus

Figure 1:
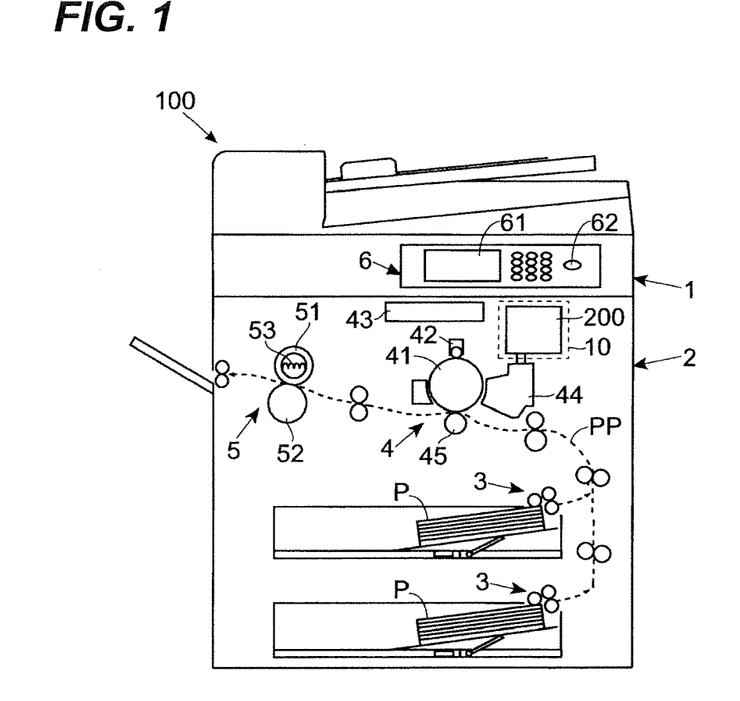
FIG. 1 illustrates an overall configuration of an image forming apparatus according to one embodiment of the disclosure.

As illustrated in FIG. 1, an image forming apparatus 100 according to an embodiment includes an image reading unit 1 and a printing unit 2. The image reading unit 1 optically reads a document to generate image data of the document. During execution of a print job, the printing unit 2, while conveying a paper sheet P along a paper sheet conveyance passage PP, forms a toner image based on image data of an image to be printed and prints (transfers) the toner image on the paper sheet P during conveyance. For example, during execution of a copy job, printing an image, which is based on image data of a document read by the image reading unit 1, on the paper sheet P is performed by the printing unit 2.

The printing unit 2 includes a paper sheet feeder 3, an image forming unit 4, and a fixing unit 5. The paper sheet feeder 3 includes a pickup roller and a feed roller pair, and feeds the paper sheet P to the paper sheet conveyance passage PP. A conveyance roller pair is located in the paper sheet conveyance passage PP, and the paper sheet P fed in the paper sheet conveyance passage PP is conveyed by the conveyance roller pair.

The image forming unit 4 includes a photoreceptor drum 41, a charging apparatus 42, an exposure apparatus 43, a developing device 44, and a transfer roller 45. During execution of a print job, the charging apparatus 42 charges the photoreceptor drum 41. The exposure apparatus 43 exposes the photoreceptor drum 41 to form an electrostatic latent image based on image data of an image to be printed on the photoreceptor drum 41. The developing device 44 supplies toner for the photoreceptor drum 41 to develop the electrostatic latent image to a toner image. The transfer roller 45 forms a transfer nip with the photoreceptor drum 41 to transfer the toner image on the paper sheet P passing through the transfer nip.

The fixing unit 5 includes a fixing roller pair that includes a heating roller 51 and a pressure roller 52. The heating roller 51 incorporates a heater 53. The pressure roller 52 is brought into pressure contact with the heating roller 51 to form a fixing nip with the heating roller 51. Then, the fixing unit 5 fixes the toner image on the paper sheet P by heating and pressurizing the paper sheet P passing through the fixing nip.

In a print job executed by the printing unit 2, the toner inside the developing device 44 is used. Consequently, toner replenishment to the developing device 44 is required. In view of this, a container 200 that houses replenishment toner is mounted to the image forming apparatus 100. Then, when a toner remaining amount inside the developing device 44 falls below a predetermined reference amount, toner replenishment to the developing device 44 from the container 200 is performed.

To mount the container 200 to the image forming apparatus 100, a mounting unit 10 is located in the image forming apparatus 100. The mounting unit 10 has a mounting space where the container 200 is mounted. In the mounting space, a supporting member (not illustrated) or similar member is arranged to support the container 200 mounted into the mounting space.

Figure 2:
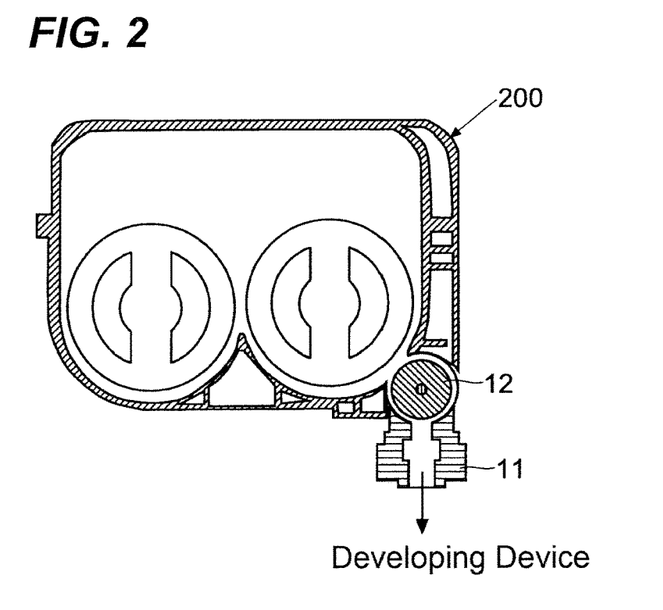
FIG. 2 illustrates a configuration of a container mounted to the image forming apparatus according to the one embodiment.

As illustrated in FIG. 2, the container 200 mounted to the mounting unit 10 is connected to the developing device 44 via a replenishing pipe 11. At one end of the replenishing pipe 11, a replenishing screw 12 is arranged. The replenishing screw 12 is constituted of a member where a blade is wound around a rotation shaft in a spiral pattern, and rotates during the toner replenishment to the developing device 44 from the container 200. This drops the toner from the container 200 and replenishes the toner to the developing device 44 via the replenishing pipe 11.

Figure 3:
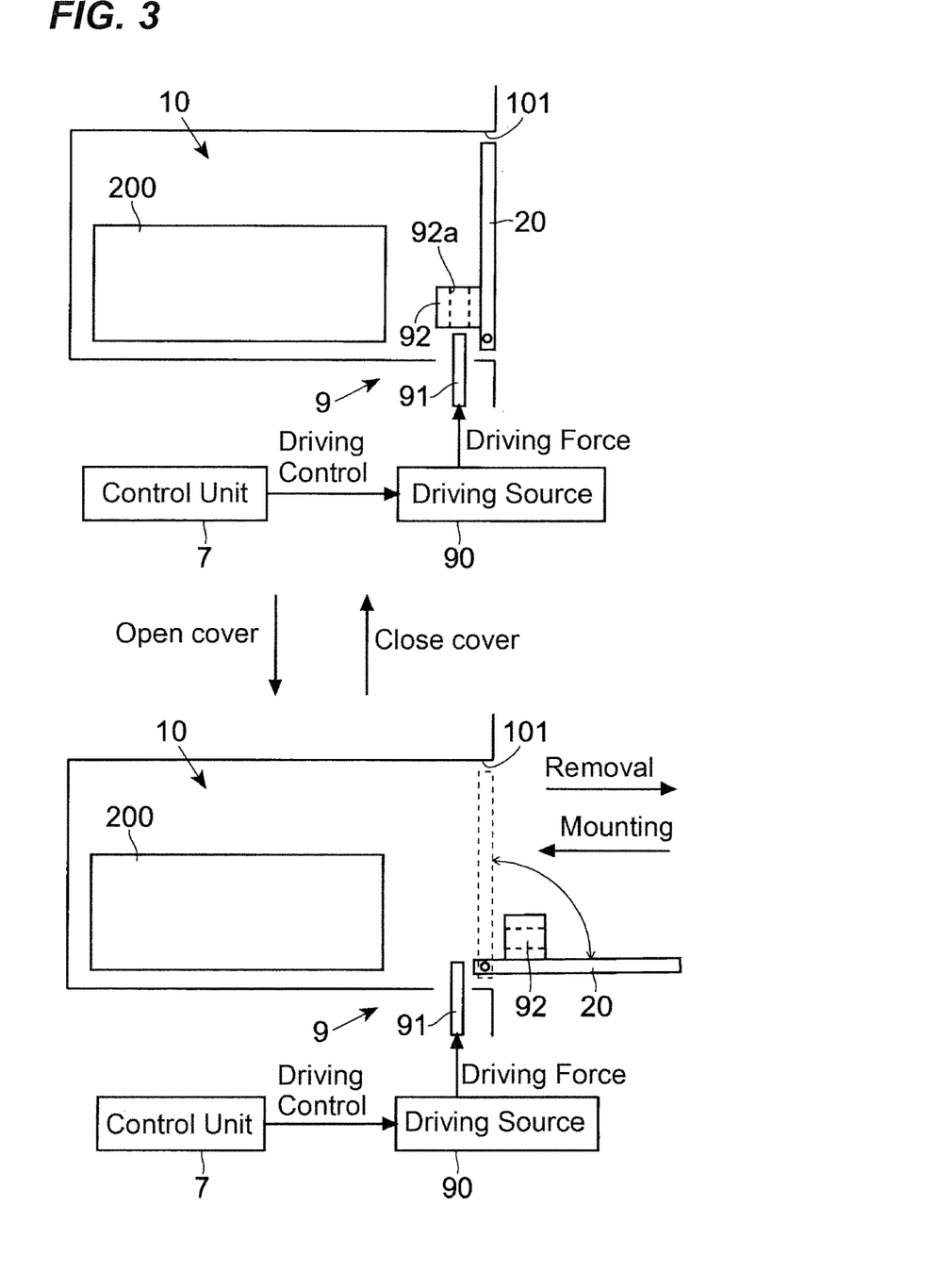
FIG. 3 illustrates a configuration of a mounting-portion periphery where the container of the image forming apparatus according to the one embodiment is mounted.

The container 200 is constituted to be removably attachable (replaceable) with respect to the mounting unit 10. For example, as illustrated in FIG. 3, a container cover 20 (corresponding to "a cover") is openably/closably located at a mounting port 101 for mounting and removing the container 200 with respect to the mounting unit 10. The container cover 20 covers the mounting port 101 (see the upper drawing in FIG. 3) by being closed, and opens the mounting port 101 by being opened (see the lower drawing in FIG. 3). Then, the container 200 is mounted or removed relative to the mounting unit 10 in a state where the container cover 20 is opened.

Returning to FIG. 1, the image forming apparatus 100 includes an operation panel 6. The operation panel 6 displays a screen and accepts an operation (an instruction) from a user. The operation panel 6 performs notification (for example, displays a screen for performing notification) relative to a user.

The operation panel 6 includes a touch panel display 61 and a hardware key 62. The touch panel display 61 displays a screen where a software key or similar key is arranged and accepts an operation relative to the screen from a user. A plurality of hardware keys 62 are located. The hardware key 62 includes, as one example, a start key for accepting an execution instruction of a print job from a user or similar key.

Figure 4:
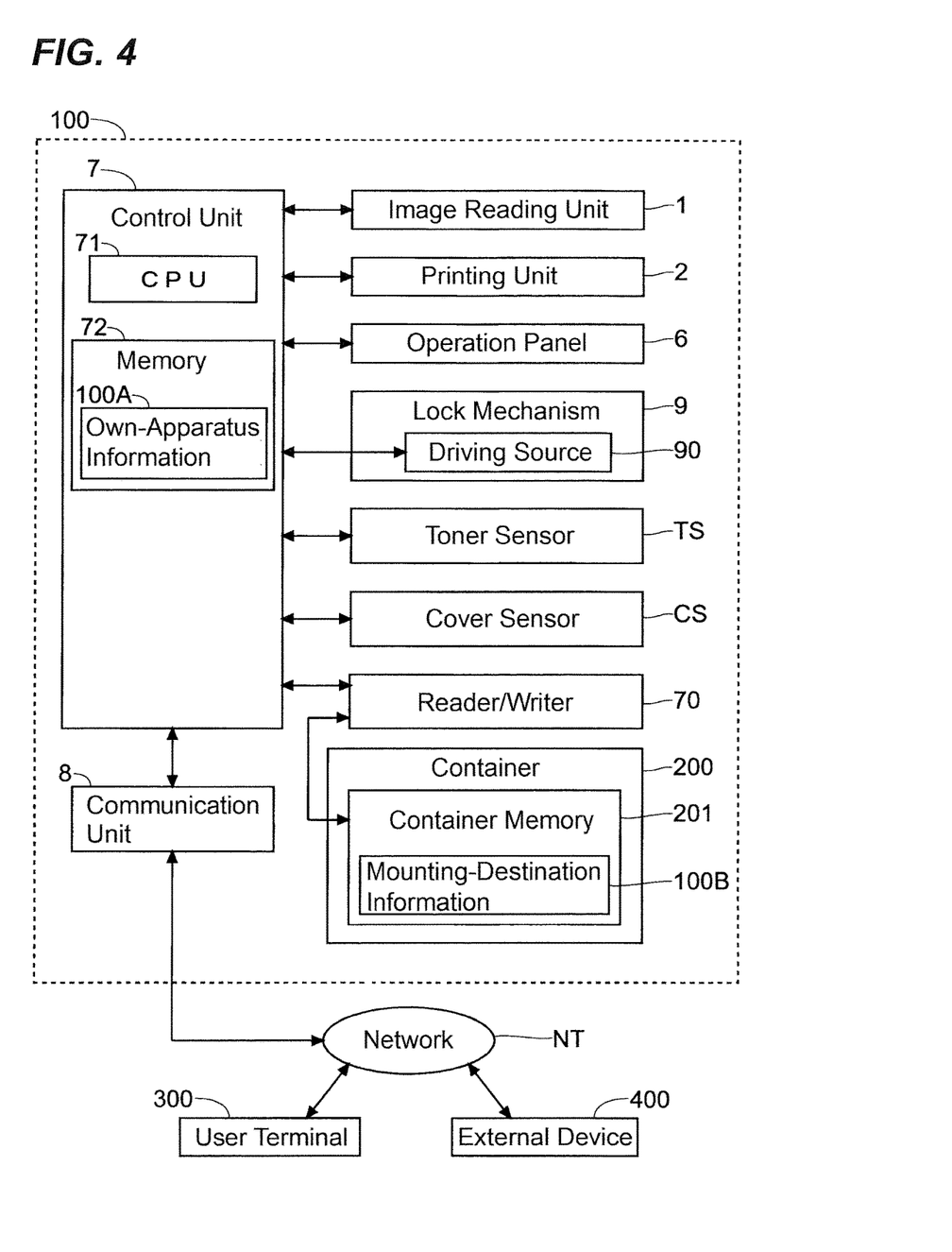
FIG. 4 illustrates a hardware configuration of the image forming apparatus according to the one embodiment.

As illustrated in FIG. 4, the image forming apparatus 100 includes a control unit 7. The control unit 7 includes a CPU 71 and a memory 72 (corresponding to "a storage unit"). The CPU 71 operates based on a control program and data. The memory 72 stores the control program and the data. Then, the control unit 7 (the CPU 71) controls operations of respective units of the image forming apparatus 100 based on the control program and the data.

Specifically, the control unit 7 is connected to the image reading unit 1 and the printing unit 2 to control a reading operation of the image reading unit 1 and a printing operation of the printing unit 2. The control unit 7 is connected to the operation panel 6 to control a display operation of the operation panel 6 and detect an operation performed with respect to the operation panel 6.

The control unit 7 controls the toner replenishment to the developing device 44 from the container 200. To control the toner replenishment, the control unit 7 performs detection of a toner remaining amount inside the developing device 44. For example, a toner sensor TS that changes an output value in accordance with the toner remaining amount inside the developing device 44 is located in the developing device 44 and is connected to the control unit 7. Then, the control unit 7 detects the toner remaining amount inside the developing device 44 based on the output value of the toner sensor TS.

When detecting that the toner remaining amount inside the developing device 44 falls below the predetermined reference amount based on the output value of the toner sensor TS, the control unit 7 determines that the toner replenishment to the developing device 44 from the container 200 is required and rotates the replenishing screw 12. This replenishes the toner to the developing device 44 from the container 200. Then, after starting the toner replenishment, the control unit 7 halts the toner replenishment when the toner remaining amount inside the developing device 44 becomes equal to or more than the reference amount.

After starting the toner replenishment, when the toner remaining amount inside the developing device 44 does not return to equal to or more than the reference amount even after a predetermined time has elapsed, the control unit 7 determines that the container 200 is in an empty state. Then, when determining that the container 200 is in the empty state, the control unit 7 performs notification processing for notifying a user that the container 200 is in the empty state. For example, the control unit 7 causes the operation panel 6 to display a message that promotes a replacement of the container 200 or similar message.

When the notification processing is performed by the control unit 7, the container cover 20 is opened and closed for replacing the container 200. That is, the container cover 20 is opened to remove the container 200 in the empty state from the mounting unit 10. Subsequently, a new container 200 (a container 200 where the toner is filled) is mounted to the mounting unit 10, and the container cover 20 is closed.

After performing the notification processing, when detecting that the container cover 20 has changed from the open state to the close state, the control unit 7 determines that the new container 200 is mounted to the mounting unit 10 and starts the toner replenishment to the developing device 44 from the container 200. For example, a cover sensor CS, which changes an output value in accordance with opening and closing of the container cover 20, is located in the mounting unit 10 and connected to the control unit 7. Then, the control unit 7 detects the opening and closing of the container cover 20 based on the output value of the cover sensor CS. By locating a sensor that changes its output value between a case where the container 200 is mounted to the mounting unit 10 and a case where the container 200 is not mounted to the mounting unit 10, a determination of whether the new container 200 is mounted to the mounting unit 10 or not may be performed based on the output value of the sensor.

Here, the container 200 includes a container memory 201 (corresponding to "a storage medium"). For example, an IC tag including a non-volatile memory or similar memory is employed as the container memory 201. To perform reading information from the container memory 201 and writing information into the container memory 201, the image forming apparatus 100 includes a reader/writer 70 (corresponding to "a reading unit").

The reader/writer 70 is connected to the control unit 7. Then, the control unit 7 uses the reader/writer 70 to perform reading information from the container memory 201 and writing information into the container memory 201. For example, when a new container 200 is mounted to the mounting unit 10, the control unit 7 reads the information written in the container memory 201. The information read at this time will be described in detail later.

After the new container 200 is mounted to the mounting unit 10, for detecting (predicting) the toner remaining amount inside the container 200, the control unit 7 counts the rotation number of the replenishing screw 12 and writes the information that indicates the rotation number of the replenishing screw 12 into the container memory 201. Then, the control unit 7 detects the toner remaining amount inside the container 200, based on the rotation number of the replenishing screw 12 after the new container 200 is mounted to the mounting unit 10.

The replenishing screw 12 drops an approximately constant amount of toner per rotation from the container 200. In other words, a target value of a toner drop amount per rotation of the replenishing screw 12 is set, and a shape and similar dimension of the replenishing screw 12 are designed to satisfy the set target value. In view of this, the toner remaining amount inside the container 200 is detectable, based on the rotation number of the replenishing screw 12 after the new container 200 is mounted to the mounting unit 10.

For example, the control unit 7 causes the operation panel 6 to display toner-remaining-amount information that indicates the toner remaining amount inside the container 200. Thus, causing the operation panel 6 to display the toner-remaining-amount information enables causing a user to recognize the toner remaining amount inside the container 200. Then, when the toner remaining amount inside the container 200 decreases, the user performs a work for ordering a new container 200.

The image forming apparatus 100 includes a communication unit 8. The communication unit 8 is an interface to connect the image forming apparatus 100 to a network NT such as a LAN. For example, a user terminal 300 (for example, the user terminal 300 is a personal computer) used by a user of the image forming apparatus 100 is connected to the network NT.

Connecting the image forming apparatus 100 to the network NT enables transmitting and receiving information between the image forming apparatus 100 and the user terminal 300. Furthermore, connecting the image forming apparatus 100 to the network NT enables access to a wide area network such as the Internet from the image forming apparatus 100.

The communication unit 8 includes, for example, a communication circuit, a memory, and a connector, and is connected to the control unit 7. Then, the control unit 7 communicates with the user terminal 300 via the communication unit 8. The control unit 7 accesses the wide area network (such as the Internet) via the communication unit 8 to communicate with an external device 400 (for example, the external device 400 is a server) that a manufacturer, a distributor, a maintenance agency, and similar business operator of the image forming apparatus 100 own and manage.

Lock Mechanism of Container

The image forming apparatus 100 includes a lock mechanism 9 for restricting a removal of the container 200 mounted to the mounting unit 10 from the mounting unit 10. Timing to restrict the removal of the container 200 and timing to release restriction will be described in detail later.

Figure 5:
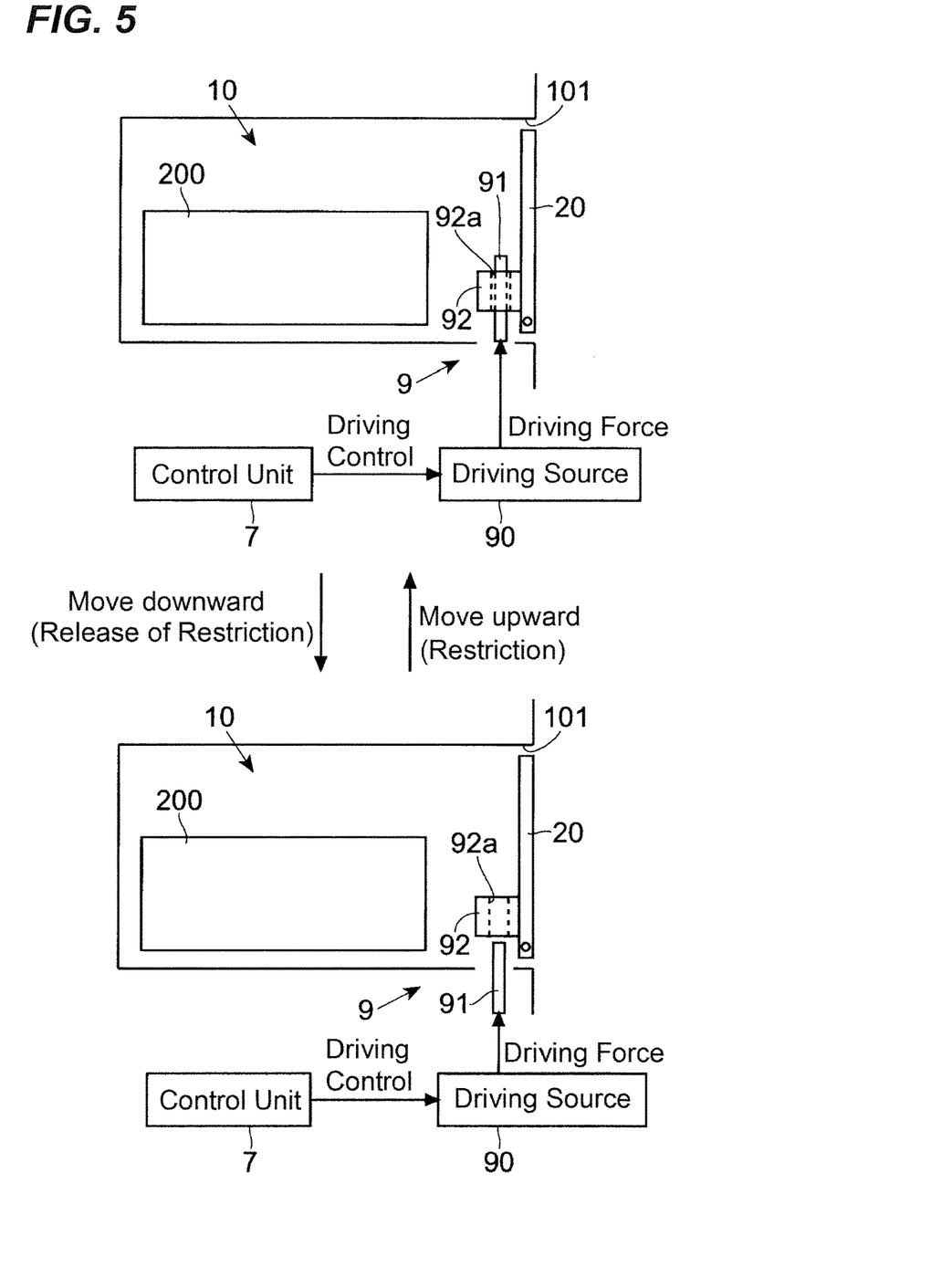
FIG. 5 illustrates the configuration of the mounting-portion periphery where the container of the image forming apparatus according to the one embodiment is mounted.

For example, the image forming apparatus 100 includes a mechanism illustrated in FIGS. 3 and 5 as the lock mechanism 9. The lock mechanism 9 illustrated in FIGS. 3 and 5 is one example, and another lock mechanism may be located in the image forming apparatus 100.

The lock mechanism 9 includes a restricting member 91 and an engaging member 92. The restricting member 91 is located in the mounting unit 10 and is movably supported in a vertical direction. While not specifically limited, the restricting member 91 is a pin-shaped member. The engaging member 92 is located on an internal surface of the container cover 20 and has an engaging hole 92a engageable with the restricting member 91.

The restricting member 91 is connected to a driving source 90 for vertically moving the restricting member 91. For example, a solenoid, a motor, or similar actuator is used for the driving source 90. The driving source 90 is connected to the control unit 7. Then, the control unit 7 performs driving control of the driving source 90. That is, the control unit 7 controls a vertical movement of the restricting member 91.

In this configuration, as illustrated in FIG. 5, when the container cover 20 is in the close state, moving the restricting member 91 upward using the driving source 90 inserts the restricting member 91 into the engaging hole 92a of the engaging member 92 (the restricting member 91 and the engaging member 92 are engaged). Engaging the restricting member 91 to the engaging member 92 makes it impossible to open the container cover 20, and, as a result, makes it impossible to remove the container 200 from the mounting unit 10. That is, a position of the restricting member 91 (a position of the restricting member 91 illustrated in the upper drawing in FIG. 5) when the restricting member 91 and the engaging member 92 are in an engaged state corresponds to "a restriction position."

Moving the restricting member 91 downward from a state where the removal of the container 200 from the mounting unit 10 is restricted (a state where the restricting member 91 and the engaging member 92 are engaged) releases the engagement of the restricting member 91 and the engaging member 92 and enables opening the container cover 20 to remove the container 200 from the mounting unit 10. That is, a position of the restricting member 91 (a position of the restricting member 91 illustrated in the lower drawing in FIG. 5) when the restricting member 91 and the engaging member 92 are in a state released from the engagement corresponds to "a release position."

When restricting the removal of the container 200 from the mounting unit 10, the control unit 7 moves the restricting member 91 to the restriction position using the driving source 90. In contrast, when permitting the removal of the container 200 from the mounting unit 10, the control unit 7 moves the restricting member 91 to the release position using the driving source 90.

Order of Container

In ordering the container 200, a specific identifier (for example, a serial number) assigned to the image forming apparatus 100 is required to notify to a container ordering destination such as the manufacturer, the distributor, the maintenance agency, and similar business operator of the image forming apparatus 100. The identifier assigned to the image forming apparatus 100 is preliminarily stored in the memory 72 as own-apparatus information 100A (see FIG. 4).

For example, in ordering the container 200, it is possible to cause the operation panel 6 to display the own-apparatus information 100A. That is, performing a predetermined operation relative to the operation panel 6 displays the own-apparatus information 100A on the operation panel 6.

Alternatively, it is also possible to transmit an identification-information display request relative to the image forming apparatus 100 from the user terminal 300. In this case, the communication unit 8 receives the identification-information display request from the user terminal 300. When the communication unit 8 receives the identification-information display request, the control unit 7 transmits the own-apparatus information 100A to the user terminal 300 via the communication unit 8. This displays the identifier indicated by the own-apparatus information 100A on the user terminal 300.

The container ordering destination performs the writing of mounting-destination information 100B that indicates the identifier assigned to the image forming apparatus 100 (the image forming apparatus 100 used by the ordering source user) where the container 200 is to be mounted, relative to a predetermined address of the container memory 201 of the container 200 to be delivered to the ordering source user (see FIG. 4). Then, the container 200 where the mounting-destination information 100B has been written into the container memory 201 is delivered to the ordering source user. That is, the information identical to the own-apparatus information 100A (the own-apparatus information 100A of which the ordering source user has notified the container ordering destination) indicating the identifier assigned to the image forming apparatus 100 used by the ordering source user is written as the mounting-destination information 100B, into the container memory 201 of the container 200 to be delivered to the ordering source user.

Here, it may be configured to be able to perform ordering the container 200 from the image forming apparatus 100. In a case of the configuration as described above, the control unit 7 causes the operation panel 6 to perform acceptance of an order instruction of the container 200. Then, when the operation panel 6 accepts the order instruction, the control unit 7 communicates with the external device 400, which the container ordering destination owns and manages, via the communication unit 8 to transmit order information including the own-apparatus information 100A to the external device 400. This completes the order of the container 200 to the container ordering destination. When the toner remaining amount inside the container 200 falls below a predetermined lower limit amount, the order of the container 200 may be automatically performed in the image forming apparatus 100.

Removal Restriction of Container

In the embodiment, after delivery of the container 200, mounting the delivered container 200 to the image forming apparatus 100, to which the identifier that has been notified to the container ordering destination during ordering the delivered container 200 has been assigned, restricts the removal of the container 200 from the mounting unit 10. That is, in this case, the container 200 mounted to the mounting unit 10 is not removed from the mounting unit 10.

Figure 6:
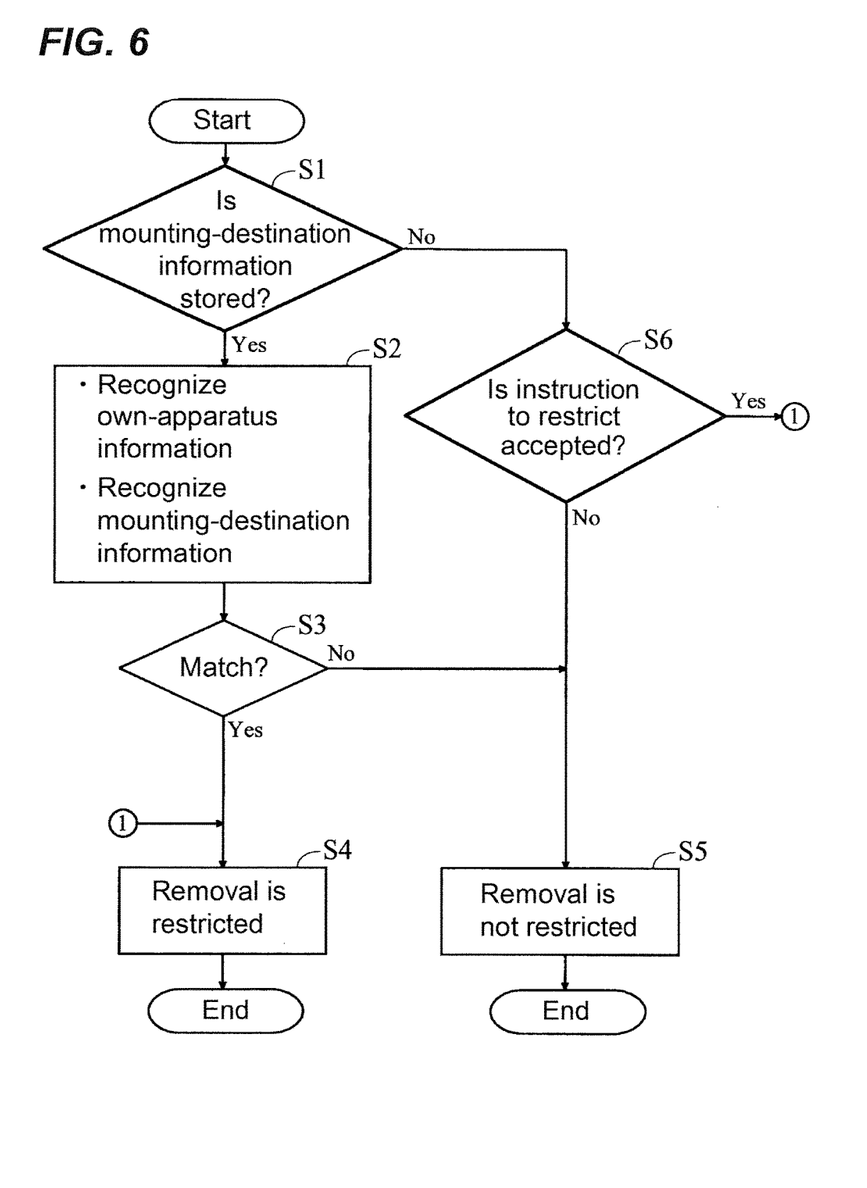
FIG. 6 illustrates a flow of processes performed when removal of the container from a mounting unit is restricted in the image forming apparatus according to the one embodiment.

The following describes a flow of processes performed when the removal of the container 200 from the mounting unit 10 is restricted, by referring to a flowchart illustrated in FIG. 6. The flowchart illustrated in FIG. 6 starts when the control unit 7 detects that the container cover 20 has changed from the open state to the close state (when the control unit 7 determines that the container 200 has been mounted to the mounting unit 10).

At Step S1, the control unit 7 causes the reader/writer 70 to read the information from the container memory 201 of the container 200, which is mounted to the mounting unit 10. Then, the control unit 7 determines whether the mounting-destination information 100B is stored in the container memory 201 or not. As a result, when the control unit 7 determines that the mounting-destination information 100B is stored in the container memory 201, the process proceeds to Step S2.

When the process proceeds to Step S2, the control unit 7 recognizes the identifier indicated by the own-apparatus information 100A, which is stored in the memory 72. The control unit 7 recognizes the identifier indicated by the mounting-destination information 100B read by the reader/writer 70.

Then, at Step S3, the control unit 7 determines whether the identifier indicated by the own-apparatus information 100A and the identifier indicated by the mounting-destination information 100B match or not. As a result, when the control unit 7 determines that they match, the process proceeds to Step S4; and when the control unit 7 determines that they do not match, the process proceeds to Step S5. After the delivery of the container 200, when the delivered container 200 is mounted to the image forming apparatus 100 (here, referred to as an ordering-source image forming apparatus 100), to which the identifier that has been notified to the container ordering destination during the ordering the delivered container 200 has been assigned, it is determined that respective identifiers of the own-apparatus information 100A and the mounting-destination information 100B match. In contrast, when the delivered container 200 is mounted to an image forming apparatus 100 different from the ordering-source image forming apparatus 100, it is determined that the respective identifiers of the own-apparatus information 100A and the mounting-destination information 1008 do not match.

When the process proceeds to Step S4, the control unit 7 moves the restricting member 91 to the restriction position using the driving source 90. This causes the restricting member 91 and the engaging member 92 to be engaged (see the upper drawing in FIG. 5). Consequently, the container cover 20 does not open, and the removal of the container 200 from the mounting unit 10 is restricted.

When the process proceeds to Step S5, the control unit 7 does not move the restricting member 91 to the restriction position. In this case, a state where the engagement of the restricting member 91 and the engaging member 92 is released (see the lower drawing in FIG. 5) is maintained. This enables the removal of the container 200 from the mounting unit 10. That is, the removal of the container 200 from the mounting unit 10 is not restricted.

At Step S1, when the control unit 7 determines that the mounting-destination information 100B is not stored in the container memory 201, the process proceeds to Step S6. For example, when the container 200 mounted to the mounting unit 10 is a non-genuine product, the mounting-destination information 100B is not stored in the container memory 201 of this container 200.

When the process proceeds to Step S6, the control unit 7 causes the operation panel 6 to perform the acceptance of an instruction as to whether to restrict the removal of the container 200 from the mounting unit 10 or not, and determines whether the operation panel 6 has accepted the instruction to restrict the removal of the container 200 from the mounting unit 10 or not. As a result, when the control unit 7 determines that the operation panel 6 has accepted the instruction to restrict the removal of the container 200 from the mounting unit 10, the process proceeds to Step S4; and when the control unit 7 determines that the operation panel 6 has accepted the instruction not to restrict or to permit the removal of the container 200 from the mounting unit 10, the process proceeds to Step S5.

Here, after moving the restricting member 91 to the restriction position, until determining that the container 200 presently mounted to the mounting unit 10 has become in the empty state, the control unit 7 maintains the restricting member 91 moved to the restriction position. Then, when determining that the container 200 presently mounted to the mounting unit 10 has become in the empty state, the control unit 7 moves the restricting member 91 to the release position where the engagement of the restricting member 91 and the engaging member 92 is released.

As described above, the image forming apparatus 100 according to the embodiment includes: the mounting unit 10 where the container 200 housing the toner is mounted; the restricting member 91 that restricts the removal of the container 200 from the mounting unit 10 by moving to the predetermined restriction position; the driving source 90 for moving the restricting member 91; the reader/writer 70 (the reading unit) that reads the mounting-destination information 100B, which is the information stored in the container memory 201 (the storage medium) located in the container 200 and the information assigned to the image forming apparatus 100 used by the ordering source user having ordered the container 200, from the container memory 201; the memory 72 (the storage unit) that preliminarily stores the own-apparatus information 100A, which is the information assigned to the own apparatus; and the control unit 7 that determines whether the mounting-destination information 100B, which the reader/writer 70 has read from the container memory 201 of the container 200 mounted to the mounting unit 10, and the own-apparatus information 100A match or not when the container 200 is mounted to the mounting unit 10, and moves the restricting member 91 to the restriction position by controlling the driving of the driving source 90 when the mounting-destination information 100B and the own-apparatus information 100A match.

In the embodiment, when the container 200 is mounted to the mounting unit 10 of the image forming apparatus 100, it is determined whether the mounting-destination information 100B and the own-apparatus information 100A match or not; and when the mounting-destination information 100B and the own-apparatus information 100A match, the removal of the container 200 from the mounting unit 10 is restricted (the restricting member 91 is moved to the restriction position). Here, the mounting-destination information 100B is the information assigned to the image forming apparatus 100 used by the ordering source user who has ordered the container 200. That is, the information assigned to the image forming apparatus 100, which is used by the ordering source user, is stored in the container memory 201 of the container 200 to be delivered to the ordering source user as the mounting-destination information 100B. In view of this, when the ordering source user mounts the container 200, which is delivered to the ordering source user himself or herself, to the image forming apparatus 100 used by the ordering source user himself or herself, the removal of the container 200 from the mounting unit 10 is restricted since the mounting-destination information 100B and the own-apparatus information 100A match. This ensures reducing the removal of the container 200 (the container 200 with remaining toner), which has been delivered to the ordering source user and has been mounted to the image forming apparatus 100 used by the ordering source user, by a third person.

In the embodiment, when the mounting-destination information 100B and the own-apparatus information 100A do not match, the control unit 7 does not move the restricting member 91 to the restriction position (does not restrict the removal of the container 200 from the mounting unit 10). In this configuration, even when the container 200 that has been ordered and delivered for mounting to a certain image forming apparatus 100 (here, referred to as a first apparatus 100) is erroneously mounted to another image forming apparatus 100 (here, referred to as a second apparatus 100), the removal of the container 200 from the second apparatus 100 is not restricted, and thus, it is possible to remove the container 200 from the second apparatus 100 to re-mount to the first apparatus 100. For example, when the control unit 7 determines that the mounting-destination information 100B and the own-apparatus information 100A do not match, the control unit 7 may perform notification processing (for example, processing that causes the operation panel 6 to display an alert indicating that the mounting destination of the container 200 is incorrect) that notifies the user that the mounting destination of the container 200 is incorrect.

In the embodiment, when the mounting-destination information 100B is not stored in the container memory 201 of the container 200 mounted to the mounting unit 10, the control unit 7 causes the operation panel 6 to perform acceptance of the instruction as to whether to restrict the removal of the container 200 from the mounting unit 10 or not. When the operation panel 6 accepts the instruction to restrict the removal of the container 200 from the mounting unit 10, the control unit 7 moves the restricting member 91 to the restriction position; and when the operation panel 6 accepts the instruction not to restrict the removal of the container 200 from the mounting unit 10, the control unit 7 does not move the restricting member 91 to the restriction position. This configuration is convenient for a user that desires to use a container 200 where the mounting-destination information 100B is not stored in the container memory 201 (for example, a container 200 of a non-genuine product) because it is possible to restrict the removal of the container 200 from the mounting unit 10.

In the embodiment, after moving the restricting member 91 to the restriction position (after restricting the removal of the container 200 from the mounting unit 10), the control unit 7 maintains the restricting member 91 moved to the restriction position until determining that the container 200 has become in the empty state; and when determining that the container 200 has become in the empty state, the control unit 7 moves the restricting member 91 to the release position (releases the restriction) where the container 200 is removable from the mounting unit 10. This configuration does not reduce convenience for a user because performing the operation for releasing the restriction is not required when the container 200 mounted to the mounting unit 10 has become in the empty state (when the container 200 is replaced).

In the embodiment, when determining that the mounting-destination information 100B and the own-apparatus information 100A match, the control unit 7 causes the restricting member 91 to engage with the engaging member 92 by moving the restricting member 91 to the restriction position from the release position to restrict the opening and closing of the container cover 20. This configuration ensures the facilitated restriction of the removal of the container 200 from the mounting unit 10.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus comprising:
   a mounting unit where a container housing toner is mounted;
   a restricting member that restricts removal of the container from the mounting unit by moving to a predetermined restriction position;
   a driving source for moving the restricting member;
   a reading unit that reads mounting-destination information from a storage medium, the mounting-destination information being information stored in the storage medium located in the container and information assigned to the image forming apparatus used by an ordering source user who has ordered the container;
   a storage unit that preliminarily stores own-apparatus information, the own-apparatus information being information assigned to its own apparatus; and
   a control unit that determines whether the mounting-destination information read from the storage medium of the container mounted to the mounting unit by the reading unit matches the own-apparatus information or not when the container is mounted to the mounting unit, and the control unit controlling driving of the driving source to move the restricting member to the restriction position when the mounting-destination information matches the own-apparatus information.

2. The image forming apparatus according to claim 1, wherein the control unit restricts the restricting member from moving to the restriction position when the mounting-destination information does not match the own-apparatus information.

3. The image forming apparatus according to claim 1, further comprising
   an operation panel that accepts an instruction from a user,
   wherein the control unit causes the operation panel to accept the instruction as to whether to restrict the removal of the container from the mounting unit when the mounting-destination information is not stored in the storage medium of the container mounted to the mounting unit, moves the restricting member to the restriction position when the operation panel accepts the instruction to restrict the removal of the container from the mounting unit, and restricts the restricting member from moving to the restriction position when the operation panel accepts the instruction not to restrict the removal of the container from the mounting unit.

4. The image forming apparatus according to claim 1, wherein the control unit determines whether the container mounted to the mounting unit has become empty or not, maintains the restricting member moved to the restriction position until determining that the container has become empty after moving the restricting member to the restriction position, and moves the restricting member to a release position where the container is removable from the mounting unit when the container has been determined to be empty.

5. The image forming apparatus according to claim 1, further comprising
   a cover openably/closably located at a mounting port for mounting and removing the container relative to the mounting unit, the cover covering the mounting port by being closed and opening the mounting port by being opened,
   wherein the cover includes an engaging member, and
   the restricting member restricts opening and closing of the cover by engaging with the engaging member of the closed cover when having moved to the restriction position.

* * * * *